(12) United States Patent
Le et al.

(10) Patent No.: US 8,014,922 B2
(45) Date of Patent: Sep. 6, 2011

(54) METHODS FOR DETECTING VEHICLE ROLLOVER

(75) Inventors: Jerry Jialiang Le, Canton, MI (US);
Cliff Chou, Farminton Hills, MI (US);
David Bauch, South Lyon, MI (US);
Kirsten Carr, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 88 days.

(21) Appl. No.: 12/369,814

(22) Filed: Feb. 12, 2009

(65) Prior Publication Data
US 2009/0150021 A1 Jun. 11, 2009

Related U.S. Application Data

(62) Division of application No. 10/941,540, filed on Sep. 15, 2004, now Pat. No. 7,522,982.

(51) Int. Cl.
*G05D 3/00* (2006.01)
*B60R 22/00* (2006.01)

(52) U.S. Cl. ............. 701/45; 701/29; 701/38; 702/141; 340/440

(58) Field of Classification Search ............. 701/38, 701/45, 29; 280/5.502, 5.507; 340/440; 702/141
See application file for complete search history.

(56) References Cited

U.S. PATENT DOCUMENTS

| | | | |
|---|---|---|---|
| 5,869,943 A | 2/1999 | Nakashima et al. | |
| 5,899,949 A | 5/1999 | Kincaid | |
| 6,055,472 A | 4/2000 | Breunig et al. | |
| 6,086,168 A | 7/2000 | Rump | |
| 6,141,604 A | 10/2000 | Mattes et al. | |
| 6,158,768 A | 12/2000 | Steffens, Jr. et al. | |
| 6,169,946 B1 | 1/2001 | Griessbach | |
| 6,175,792 B1 | 1/2001 | Jones et al. | |
| 6,182,783 B1 | 2/2001 | Bayley | |
| 6,282,474 B1 | 8/2001 | Chou et al. | |
| 6,301,536 B1 | 10/2001 | Vaessen et al. | |

(Continued)

FOREIGN PATENT DOCUMENTS

DE 10235567 A1 2/2004

(Continued)

OTHER PUBLICATIONS

A sun Spot based automatic vehicular accident notification system; Acharya, D.; Kumar, V.; Garvin, N.; Greca, A.; Gaddis, G.M.; Information Technology and Applications in Biomedicine, 2008. ITAB 2008. International Conference on; Digital Object Identifier: 10.1109/ITAB.2008.4570547; Publication Year: 2008 , pp. 296-299.*

(Continued)

*Primary Examiner* — Cuong H Nguyen
(74) *Attorney, Agent, or Firm* — O'Brien Jones, PLLC

(57) ABSTRACT

An automobile rollover detection system comprising a control module to receive a first set and a second set of signals, to determine a first threshold in response to the first set of signals, to determine a second threshold in response to the second set of signals, to provide a first signal in response to the first threshold, to provide a second signal in response to the second threshold, and to provide a control signal in response to the first and second signals. The control signal may activate an occupant restraint system in response to the detection of an automobile rollover event. Other embodiments are also claimed and described.

10 Claims, 4 Drawing Sheets

U.S. PATENT DOCUMENTS

| | | | |
|---|---|---|---|
| 6,311,111 B1 | 10/2001 | Leimbach et al. | |
| 6,312,013 B1 | 11/2001 | Baur et al. | |
| 6,349,247 B1 | 2/2002 | Schramm et al. | |
| 6,433,681 B1 | 8/2002 | Foo et al. | |
| 6,438,464 B1* | 8/2002 | Woywod et al. | 701/1 |
| 6,526,334 B1 | 2/2003 | Latarnik et al. | |
| 6,529,803 B2 | 3/2003 | Meyers et al. | |
| 6,542,073 B2 | 4/2003 | Yeh et al. | |
| 6,584,388 B2 | 6/2003 | Schubert et al. | |
| 6,594,570 B2 | 7/2003 | Nagao et al. | |
| 6,600,414 B2 | 7/2003 | Foo et al. | |
| 6,654,671 B2* | 11/2003 | Schubert | 701/1 |
| 6,678,633 B2 | 1/2004 | Hessmert et al. | |
| 6,684,140 B2 | 1/2004 | Lu | |
| 6,694,225 B2 | 2/2004 | Aga et al. | |
| 6,711,482 B2* | 3/2004 | Shiino et al. | 701/37 |
| 6,714,848 B2 | 3/2004 | Schubert et al. | |
| 6,910,746 B2 | 6/2005 | Kato et al. | |
| 7,057,503 B2* | 6/2006 | Watson | 340/440 |
| 7,066,560 B2 | 6/2006 | Kato et al. | |
| 7,162,340 B2 | 1/2007 | Schubert et al. | |
| 7,162,343 B2 | 1/2007 | Subbian et al. | |
| 7,165,008 B2* | 1/2007 | Choi | 702/141 |
| 7,392,127 B2 | 6/2008 | Kato et al. | |
| 7,440,844 B2 | 10/2008 | Barta et al. | |
| 7,522,982 B2* | 4/2009 | Le et al. | 701/45 |
| 7,778,741 B2* | 8/2010 | Rao et al. | 701/1 |
| 2002/0069004 A1 | 6/2002 | Marchthaler et al. | |
| 2003/0088349 A1 | 5/2003 | Schubert et al. | |
| 2003/0093201 A1 | 5/2003 | Schubert et al. | |
| 2003/0182041 A1* | 9/2003 | Watson | 701/45 |
| 2003/0204293 A1* | 10/2003 | Shiino et al. | 701/37 |
| 2003/0225499 A1 | 12/2003 | Holler | |
| 2004/0002802 A1 | 1/2004 | Ide et al. | |
| 2004/0007860 A1 | 1/2004 | Miyata et al. | |
| 2004/0128060 A1 | 7/2004 | Park | |
| 2004/0158368 A1 | 8/2004 | Haas | |
| 2004/0193352 A1 | 9/2004 | Ito et al. | |
| 2004/0210368 A1 | 10/2004 | Ide et al. | |
| 2004/0254710 A1 | 12/2004 | Yano | |
| 2005/0004730 A1 | 1/2005 | Suzuki et al. | |
| 2005/0012392 A1 | 1/2005 | Kato et al. | |
| 2005/0017578 A1 | 1/2005 | Kato et al. | |
| 2005/0027426 A1* | 2/2005 | Kato et al. | 701/70 |
| 2005/0033486 A1 | 2/2005 | Schmitt et al. | |
| 2005/0033549 A1 | 2/2005 | Clark | |
| 2005/0046274 A1 | 3/2005 | Banno et al. | |
| 2005/0114072 A1* | 5/2005 | Choi | 702/141 |
| 2005/0154512 A1 | 7/2005 | Schubert et al. | |
| 2005/0187687 A1 | 8/2005 | Geborek et al. | |
| 2005/0222729 A1* | 10/2005 | Sakata | 701/38 |
| 2006/0058934 A1* | 3/2006 | Le et al. | 701/38 |
| 2006/0064218 A1 | 3/2006 | Subbian et al. | |
| 2007/0017726 A1 | 1/2007 | Takemura | |
| 2008/0243335 A1* | 10/2008 | Rao et al. | 701/38 |
| 2009/0150021 A1* | 6/2009 | Le et al. | 701/29 |

FOREIGN PATENT DOCUMENTS

| | | | |
|---|---|---|---|
| DE | 10316253 A1 | 10/2006 | |
| EP | 1 110 834 A2 | 6/2001 | |
| EP | 1 110 835 A2 | 6/2001 | |
| EP | 1 118 507 A1 | 7/2001 | |
| EP | 1 227 010 A2 | 7/2002 | |
| EP | 1 566 315 A1 | 8/2005 | |
| GB | 2 335 521 A | 9/1999 | |
| JP | 11170976 A | 6/1999 | |
| JP | 11170992 A | 6/1999 | |
| JP | 2001 071844 A | 3/2001 | |
| JP | 2002 200962 A | 7/2002 | |
| JP | 2003 040095 A | 2/2003 | |
| JP | 2003 115824 | 4/2003 | |
| JP | 2005 001522 A | 1/2005 | |
| JP | 2005 022553 A | 1/2005 | |
| JP | 2005 047415 A | 2/2005 | |
| JP | 2006 027570 A | 2/2006 | |
| JP | 2006 056318 A | 3/2006 | |
| JP | 2006 168441 A | 6/2006 | |
| JP | 2006 298249 A | 11/2006 | |
| JP | 2007514585 W | * 6/2007 | |
| WO | WO 96/06418 A1 | 2/1996 | |
| WO | WO 03/081180 A2 | 10/2003 | |
| WO | PCT/US2005/010014 | * 3/2005 | |
| WO | WO 2005051738 A1 | * 6/2005 | |
| WO | WO 2005095133 A1 | * 10/2005 | |

OTHER PUBLICATIONS

Robust observer for prevention of vehicle rollover; Rabhi, A.; Chadli, M.; El Hajjaji, A.; Bosche, J.; Advances in Computational Tools for Engineering Applications, 2009. ACTEA '09. International Conference on; Digital Object Identifier: 10.1109/ACTEA.2009.5227837; Publication Year: 2009, pp. 627-632.*

Unified Chassis Control for Rollover Prevention and Lateral Stability; Jangyeol Yoon; Wanki Cho; Bongyeong Koo; Kyongsu Yi; Vehicular Technology, IEEE Transactions on; vol. 58, Issue: 2; Digital Object Identifier: 10.1109/TVT.2008.927724 Publication Year: 2009, pp. 596-609.*

A Mobile System for Detecting and Notifying Vehicle Rollover Events; Acharya, D.; Kumar, V.; Gaddis, G.M.; Advanced Computing and Communications, 2007. ADCOM 2007. International Conference on; Digital Object Identifier: 10.1109/ADCOM.2007.102; Publication Year: 2007, pp. 268-275.*

Measurement of Absolute Vehicle Speed With a Simplified Inverse Model; Mei, T.X.; Li, H.; Vehicular Technology, IEEE; Transactions on; vol. 59, Issue: 3; Digital Object Identifier: 10.1109/TVT.2010.2040199; Publication Year: 2010, pp. 1164-1171.*

A. G. Nalecz; A. C. Bindemann; and C. Bare, "Sensitivity Analysis of Vehicle Tripped Rollover Model", Report DOT HS 807 300, NHTSA, Jul. 1988.*

W.R. Garrott, "Rollover Research Activities at the Vehicle Research and Test Center—Frequency Response Testing", Report DOT HS 807 993, NHTSA, Jun. 1992.*

W.R. Garrott; J.G. Howe; and G. Forkenbrock, "An Experimental Examination of Selected Maneuvers That May Induce On-Road Untripped, Light Vehicle Rollover—Phase II of NHTSA's 1997‐1998 Vehicle Rollover Research Program", Report VRTC-86-0421, NHTSA, Jul. 1999.*

"Roll Over Detection," Peter Steiner, Peter Weidel, Herman Kublbeck, Helmut Steurer, an Peter Hora, SAE Technical Paper Series, Feb. 24-27, 1997, pp. 45-49.*

"Problems of Using Accelerometers to Measure Angular Rate in Automobiles," P.E.M. Frere, Sensors and Actuators A. 25-27, 1991, pp. 821-824; Ward's Auto World, Natalie Neff, vol. 32, No. 11.*

A Stability Control by Active Angle Control of Front-Wheel in a Vehicle System; Ohara, H.; Murakami, T.; Industrial Electronics, IEEE Transactions on; vol. 55, Issue 3, Mar. 2008 pp. 1277-1285; Digital Object Identifier 10.1109/TIE.2007.909051.*

Robust Model-Based Fault Detection for a Roll Stability Control System; Li Xu; Tseng, H.E.; Control Systems Technology, IEEE Transactions on; vol. 15, Issue 3, May 2007 pp. 519-528; Digital Object Identifier 10.1109/TCST.2006.890287.*

Integrating INS Sensors With GPS Measurements for Continuous Estimation of Vehicle Sideslip, Roll, and Tire Cornering; Stiffness; Bevly, D. M.; Ryu, J.; Gerdes, J. C.; Intelligent Transportation Systems, IEEE Transactions on; vol. 7, Issue 4, Dec. 2006 pp. 483-493; Digital Object Identifier 10.1109/TITS.2006.883110.*

UK Patent Search Application No. GB 0517249.9, dated Dec. 9, 2005.

Bicycles, motorcycles, and models; Limebeer, D.J.N.; Sharp, R.S.; Control Systems Magazine. IEEE vol. 26, Issue 5, Oct. 2006 pp. 34-61.

An anti-lock braking control system for a hybrid electromagnetic/electrohydraulic brake-by-wire system; Anwar, S.; American Control Conference, 2004. Proceedings of the 2004; vol. 3, Jun. 30-Jul. 2, 2004 pp. 2699-2704 vol. 3.

Vehicle Yaw Control via Second-Order Sliding-Mode Technique; Canale, M.; Fagiano, L.; Ferrara, A.; Vecchio, C.; Industrial Electronics, IEEE Transactions on; vol. 55, Issue 11, Nov. 2008 pp. 3908-3916; Digital Object Identifier 10.1109/TIE.2008.2003200.

New Automotive Sensors-A Review; Fleming, W.J.; Sensors Journal, IEEE; vol. 8, Issue 11, Nov. 2008 pp. 1900-1921; Digital Object Identifier 10.1109/JSEN.2008.2006452.

Robust Model-Based Fault Detection for a Roll Stability Control System; Li Xu; Tseng, H.E.; Control Systems Technology, IEEE Transactions on; vol. 15, Issue 3, May 2007 pp. 519-528; Digital Object Identifier 10.1109/TCST.2006.890287.

Predictive Active Steering Control for Autonomous Vehicle Systems: Falcone, P.; Borrelli. F.; Asgari, J.; Tseng, H.E.; Hrovat, D.; Control Systems Technology. IEEE Transactions on; vol. 15, Issue 3, May 2007 pp. 566-580; Digital Object Identifier 10.1109/TCST.2007.894653.

Control systems for mobile Satcom antennas; Debruin, J.; Control Systems Magazine, IEEE; vol. 28, Issue 1. Feb. 2008 pp. 86-101; Digital Object Identifier 10.1109/MCS.2007.910205.

Quaternion-based extended Kalman filter for determining orientation by inertial and magnetic sensing; Sabatini, A.M.; Biomedical Engineering, IEEE Transactions on; vol. 53, Issue 7, Jul. 2006 pp. 1346-1356; Digital Object Identifier 10.1109/TBME.2006.875664.

A Dynamic-Model-Based Wheel Slip Detector for Mobile Robots on Outdoor Terrain; Ward. C.C.; Iagnemma, K.; Robotics, IEEE Transactions on; vol. 24, Issue 4, Aug. 2008 pp. 821-831; Digital Object Identifier 10.1109/TRO.2008.924945.

Investigation of Sliding-Surface Design on the Performance of Sliding Mode Controller in Antilock Braking Systems, Taehyun Shim; Sehyun Chang; Seok Lee; Vehicular Technology, IEEE Transactions on; vol. 57, Issue 2, Mar. 2008, pp. 747-759; Digital Object Identifier 10.1109/TVT.2007.905391.

A Stability Control by Active Angle Control of Front-Wheel in a Vehicle System; Ohara, H.; Murakami, T.; Industrial Electronics, IEEE Transactions on; vol. 55, Issue 3, Mar. 2008 pp. 1277-1285; Digital Object Identifier 10.1109/TIE.2007.909051.

A Simplified Quaternion-Based Algorithm for Orientation Estimation From Earth Gravity and Magnetic Field Measurements, Yun Xiaoping; Bachmann, E.R.; McGhee, R.B.; Instrumentation and Measurement, IEEE Transactions on; vol. 57, Issue 3, Mar. 2008. pp. 638-650; Digital Object Identifier 10.1109/TIM.2007.911646.

Integrating INS Sensors With GPS Measurements for Continuous Estimation of Vehicle Sideslip, Roll, and Tire Cornering: Stiffness; Bevly, D.M.; Ryu, J.; Gerdse, J.C.; Intelligent Transportation Systems, IEEE Transactions on; vol. 7, Issue 4, Dec. 2006, pp. 483-493: Digital Object Identifier 10.1109/TITS.2006.883110.

Neuroadaptive Combined Lateral and Longitudinal Control of Highway Vehicles Using RBF Networks: Kumarawadu, S.; Lee, T.T.; Intelligent Transportation Systems, IEEE Transactions on; vol. 7, Issue 4, Dec. 2006, pp. 500-512, Digital Object Identifier 10.1109/TITS.2006.883113.

* cited by examiner

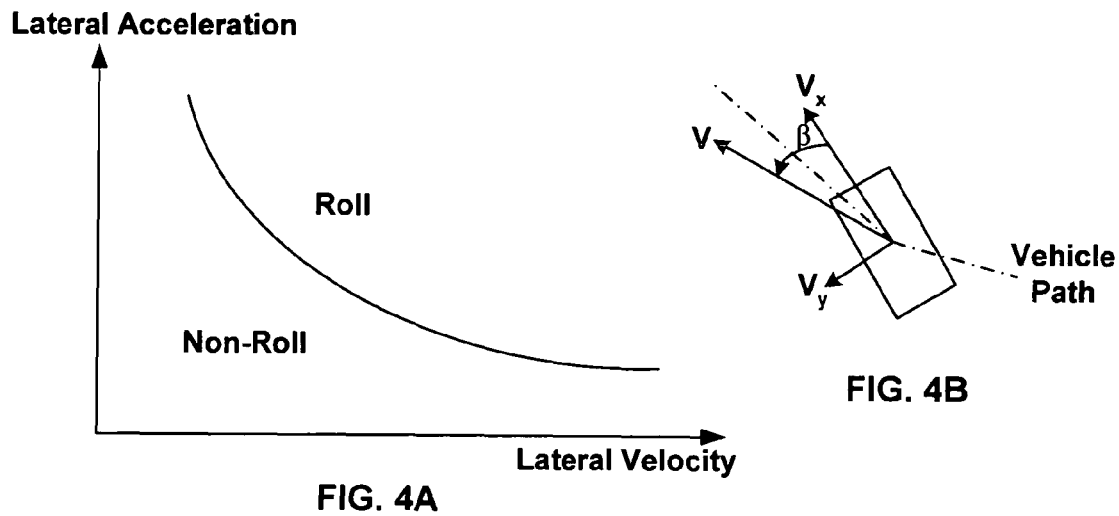
FIG. 4A
FIG. 4B
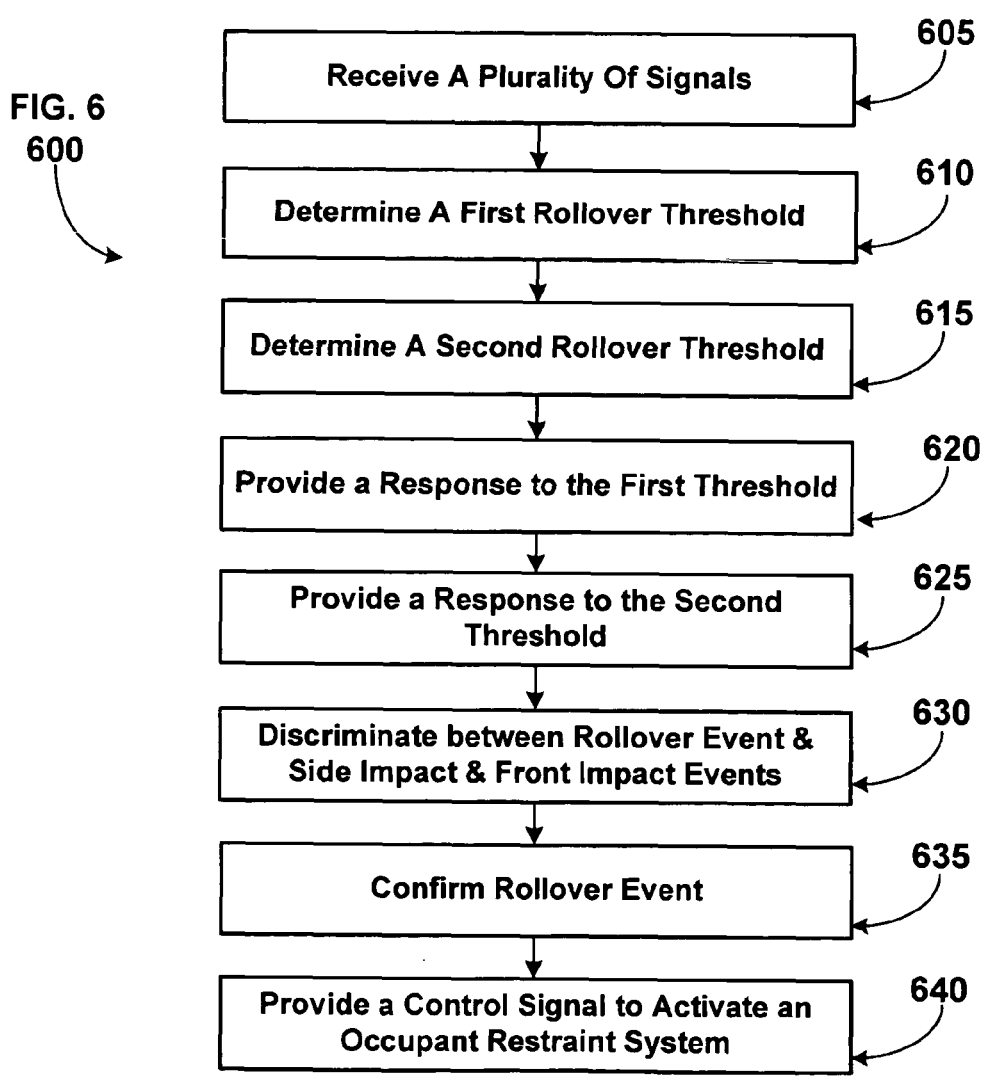
FIG. 6
600

METHODS FOR DETECTING VEHICLE ROLLOVER

The is a divisional of application Ser. No. 10/941,540, filed Sep. 15, 2004 now U.S. Pat. No. 7,522,982, which is incorporated herein by reference.

TECHNICAL FIELD

The various embodiments of the present invention relate generally to automobile systems, and more particularly, to methods and systems for detecting automobile rollovers.

BACKGROUND

The proliferation of vehicle occupant restraint systems in recent years has saved many lives when unfortunate vehicle accidents occur. Various vehicle occupant restraint systems are utilized and typical inflatable restraint systems include driver and passenger front airbags, side airbags and side curtain airbags. Non-inflatable restraint systems also exist, and a pretensioner seatbelt system that tightens seatbelts is a sample non-inflatable restraint system. These various occupant restraint systems are all critical in protecting vehicle occupants during accidents, but are only as good as the detection and deployment systems tasked with detecting and deploying occupant restraint systems.

Typically, deployment and detection control systems utilize several signals from sensors placed throughout an automobile to determine if certain predetermined thresholds are crossed when initiating an occupant restraint system. For example, side airbags use lateral acceleration sensors to detect the lateral acceleration of a vehicle and a side impact event. If the lateral acceleration sensor detects a lateral acceleration above or below a certain predetermined threshold, the deployment control system may trigger the corresponding side airbag(s) to protect vehicle occupants. Although current deployment systems provide safer vehicles than those not having any deployment and detection systems, some such systems may inadvertently misfire causing a vehicle occupant restraint system to deploy when a crash event or rollover event is not actually occurring. Such misfires may harm vehicle occupants, alarm vehicle occupants which may result in an accident, and may cost vehicle owners large sums of money to repackage or reset occupant restraint systems. Additionally, certain deployment systems may inadvertently deploy rollover restraint systems instead of a crash system during a crash, or deploy crash restraint system during a rollover event.

What is needed, therefore, is a rollover detection system capable of distinguishing between crash (front impact and side impact), rollover, and safe events to prevent the misfiring of crash and rollover occupant restraint systems. Methods and systems capable of detecting automobile rollover events while utilizing existing vehicle data sensors and confirming that a rollover or crash event is occurring would prevent occupant restraint systems from inadvertently misfiring.

SUMMARY

The present invention provides an improved rollover sensing system that may be used to determine when to activate various vehicle occupant restraints. The rollover detection system may include a longitudinal acceleration sensor, a side acceleration sensor, a vertical acceleration sensor, a lateral acceleration sensor, a roll rate sensor, an initial roll angle detector, a yaw-rate sensor, a side-slip angle detector, a vehicle speed sensor, and a wheel status sensor. The rollover detection system may be adapted to determine a first rollover threshold in response to the roll rate and roll angle detector and calculates an adjusted threshold as a function of the predetermined rollover threshold and the lateral acceleration. The rollover detection system may also be adapted to determine a second rollover threshold in response to the lateral acceleration, yaw-rate, side-slip angle, vehicle speed, and wheel status. The rollover detection system may further be adapted to generate a control signal in response to the first or second threshold.

BRIEF DESCRIPTION OF DRAWINGS

FIG. 4A depicts a plot of lateral acceleration versus lateral velocity showing a lateral energy based rollover detection threshold.

FIG. 4B depicts a vehicle's sideslip angle and associated vehicle velocities.

FIG. 6 depicts a logic flow diagram of a method of an embodiment of the present invention.

DETAILED DESCRIPTION

The various embodiments of the present invention provide methods and systems for detecting automobile rollover. Some embodiments of the present invention may be used in automobiles of various types to determine if a rollover or crash event is occurring. Still some embodiments may be used to deploy one or more occupant restraint systems upon detecting (or sensing) a rollover event to protect vehicle occupants. Still yet some embodiments of the present invention may be used to distinguish between rollover and non-rollover events by utilizing existing vehicle data sensors and confirming rollover events to ensure that occupant restraint systems do not deploy during non-rollover or other non-crash events.

Figure 1:
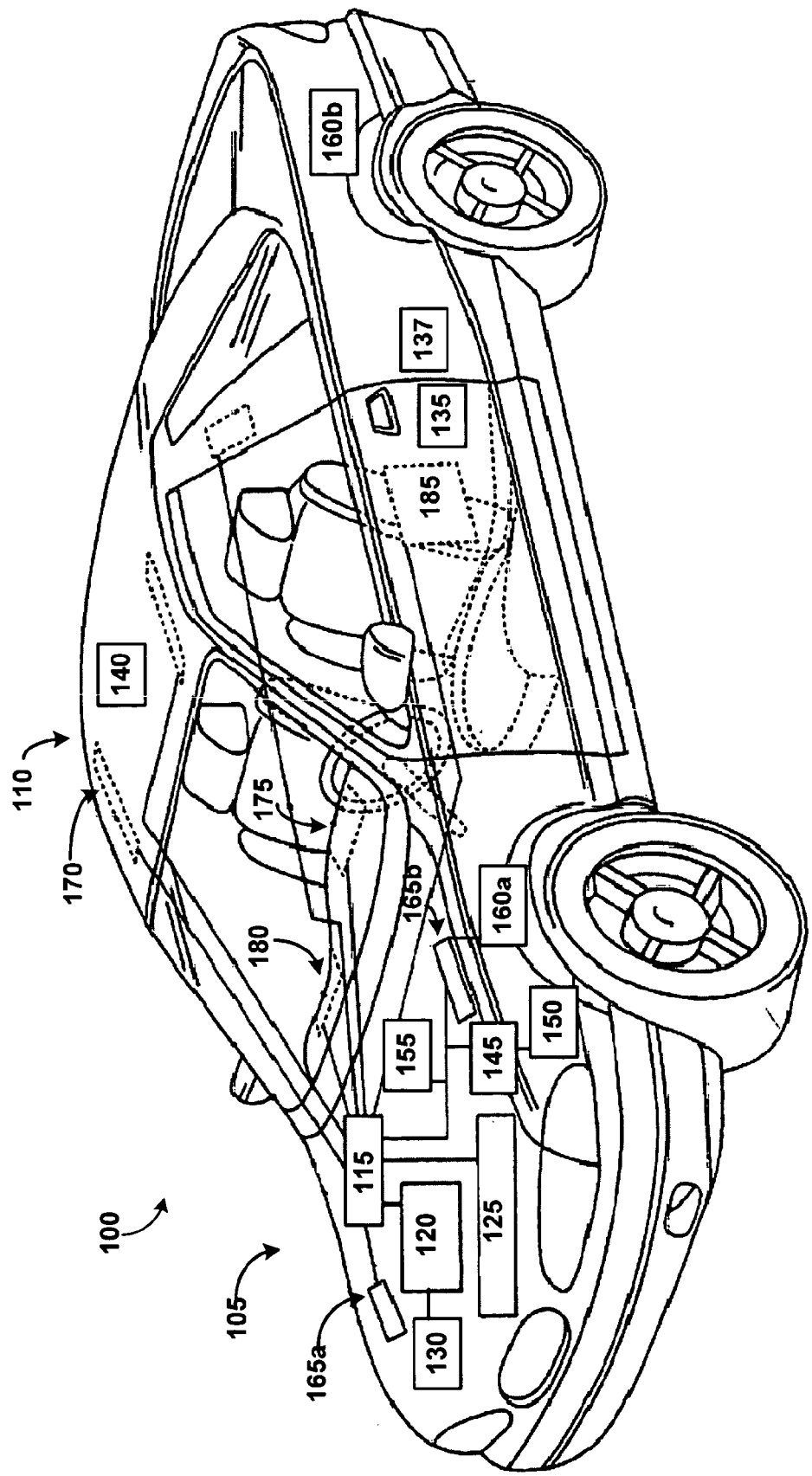
FIG. 1 depicts an automobile utilizing an embodiment of the present invention.

Now referring to the figures, FIG. 1 is a perspective view of an automobile utilizing an embodiment of a rollover detection system. As illustrated, a vehicle 100 has a rollover sensing system 105 coupled to an occupant restraint system 110. Although vehicle 100 is depicted as a car, vehicle 100 may be any type of vehicle including a truck, a van, a sport utility vehicle, or other automotive vehicle. Rollover sensing system 105 may generally comprise a control circuit 115 (control circuit may also mean control module or controller), a roll rate sensor 120, a roll angle detector 125, a longitudinal accelerometer 130, a side acceleration accelerometer 135, a side satellite pressure signal 137, a vertical accelerometer 140, a yaw rate sensor 145, side slip angle sensor 150, a vehicle speed sensor 155, a wheel status sensor 160, and a lateral accelerometer 165. Other sensors may also be utilized in some embodiments of the invention, and some of the sensors 120-165 may be used to generate signal inputs for ancillary algorithms or to calculate data based on the sensor signals that may be used in some embodiments of the invention. For example, roll angle detector 125 and/or side slip angle detector 150 may be a sensor or may be a calculation based on at least one other sensor signal or other data.

Also, the sensors 120-165 used in accordance with the various embodiments of the invention may comprise subparts such that the sensors 120-165 may sense data from various parts of vehicle 100. For example, lateral accelerometer 165 may comprise two sensors 165a and 165b and wheel status sensor 160 may comprise multiple sensors 160a, 160b, 160c (not shown), and 160d (not shown) to record data for each wheel of vehicle 100. The sensors used in accordance with the various embodiments of the invention may be electrically or wirelessly coupled to control circuit 115, any other sensor, or other vehicle data system. Those of ordinary skill in the art will understand that the placement of the sensors in FIG. 1 is for informational purposes only and that actual placement of the sensors will depend upon implementation of the various embodiments of the present invention.

Control circuit 115 may have various features in controlling the rollover sensing system 105. Control circuit 115 may have any number of inputs and outputs depending on the implementation of rollover sensing system 105. Control circuit 115 may be microprocessor based, or may be implemented with software, hardware, or a combination of both. Additionally, control circuit 115 may be capable of receiving and transmitting wireless signals to the sensors or to other wireless devices such as an emergency call system or automotive repair system. Control circuit 115 may be shared with occupant restraint system 110, or occupant restraint system 110 may have its own controller. Control circuit 115 may be used to determine a first rollover threshold in response to a roll rate signal, an initial roll angle signal, and a second rollover threshold in response to a lateral velocity signal and a lateral acceleration signal. The rollover thresholds may be a kinetic energy-based or a lateral kinetic energy-based indication of vehicle rollover, and may be dynamic thresholds, static thresholds or both. For example in some embodiments, the control circuit 115 may be used to calculate an adjusted threshold based on the lateral acceleration signal and the kinetic energy based or the lateral energy-based rollover threshold. This feature of some embodiments of the present invention enables a rollover detection system the ability to detect both slow and fast rollover events. Control circuit 115 may also utilize one or more safing modules or other redundancy methods to confirm that a kinetic energy-based or a lateral energy-based threshold has been crossed indicating that a rollover event has occurred. Control circuit 115 may also control and initiate the occupant restraint system 110.

In addition to control circuit 115, rollover detection system 105 and occupant restraint system 110 may comprise various restraint devices. Such devices may include an inflatable curtain airbag 170, a driver side front airbag 175, a passenger side front airbag 180, a side airbag 185, a belt retractor (not shown), and a pyro-buckle pretensioner (not shown). One or more these restraint devices may be used in the various embodiments of the present invention and control circuit 115 may be adapted to activate these restraint devices at the same time or at different time intervals. Control circuit 115 may also be used to control the actuation of each of the restraint devices 170-185. Various other sensors and separate controllers may also be used in some embodiments to control each of the occupant restraint devices 170-185. Control circuit 115 may deploy the restraint devices by generating one or more control signals in response to the kinetic energy threshold or the lateral kinetic energy threshold.

Figure 2:
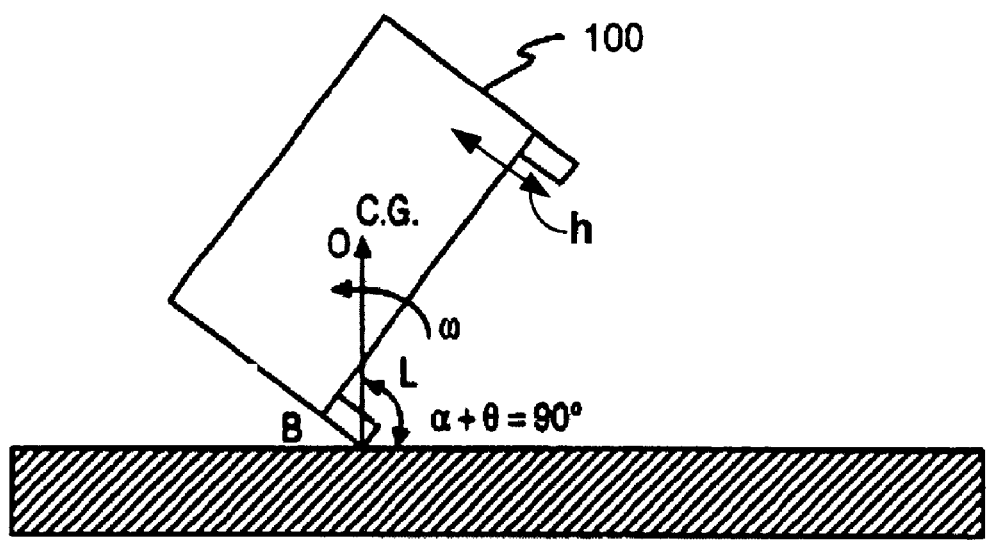
FIG. 2 depicts a simplified vehicle rollover model at a rollover condition.
Figure 3:
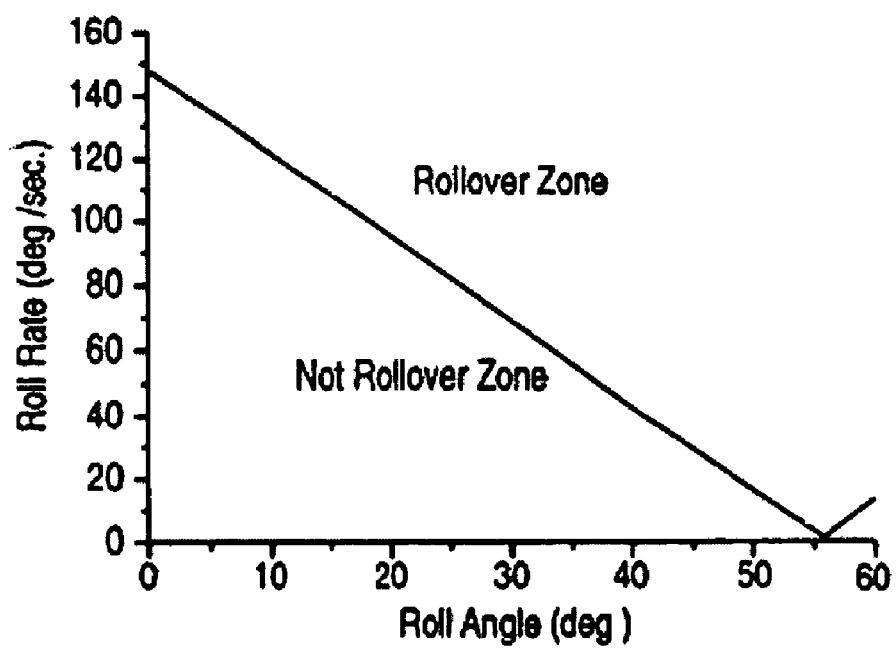
FIG. 3 depicts a plot of roll rate versus roll angle showing a kinetic energy based rollover threshold.

Referring now to FIGS. 2 and 3, a kinetic energy-based criterion for a rigid body based on vehicle kinematics is illustrated with respect to vehicle 100. This threshold is based on the amount of potential energy needed to overcome the kinetic energy of a vehicle to roll a vehicle. The potential energy required to cause the vehicle to roll depends on the change in height (ΔH) of the center of mass (O), from a normal resting position (not shown). This potential energy may be expressed as:

$$E1 = \Delta H mg = (L-h)mg$$

where m is vehicle mass, g is the gravitational constant, L is the distance between the center of gravity and rolling point B, and h is the distance between the center of gravity (O) and the road surface under normal operating conditions. Also, the total energy a vehicle possesses consists of the potential energy and the kinetic energy, wherein the kinetic energy may be expressed as:

$$E2 = (L \times \sin(\alpha+\theta) - h)mg + ((I_o \omega^2)/2)$$

where θ is the angular displacement, $I_o$ is the moment of inertia of the vehicle with respect to the point the center of gravity (O), and ω is the vehicle rotational velocity. If the kinetic energy (E2) is greater than the potential energy (E1), then a vehicle rollover will occur. In determining the conditions under which a vehicle rollover may occur using a kinetic energy based threshold, an index (or measurement), $I_{index}$ can be defined as:

$$I_{Index} = E1 - E2$$

which when substituted from above is:

$$I_{Index} = L(1-\sin(\alpha+\theta))mg - ((I_o \omega^2)/2)$$

where $\alpha = \tan^{-1}(2h_{cg}/T)$ which is a stability index for determining the tripping point (or rollover point) of a vehicle. The plot illustrated in FIG. 3 depicts roll rate (ω) versus roll angle (θ) to illustrate that the rollover/non-rollover threshold is nearly linear. Such a threshold may be utilized by some embodiments of the present invention to detect when a rollover event is occurring. Some embodiments of the present invention also utilize a lateral kinetic energy threshold to detect rollover events.

FIG. 4A depicts a plot of lateral acceleration versus lateral velocity showing a lateral energy based rollover detection threshold. The lateral kinetic energy threshold may utilize a lateral acceleration versus lateral velocity threshold to detect rollover events. As shown, if the lateral velocity and the lateral accleration of a vehicle are above the lateral kinetic energy threshold then a rollover event will occur, and if the lateral velocity and the lateral acceleration of a vehicle are below the lateral kinetic energy threshold than a rollover event will not occur. This feature of the embodiments of the present invention may enable a rollover detection system to detect a rollover event earlier than a kinetic energy based threshold as the quantity of lateral energy transferred from forward energy may be calculated and used to determine the existence of a rollover event. The lateral energy of a vehicle may be calculated by:

$$E = 0.5m(v_2^2 - v_1^2)$$

where m is vehicle mass, and $v_1$ and $v_2$ are lateral velocities that a vehicle may have at different times. With reference to FIG. 4B, lateral velocity $V_y$ may approximately be calculated as $V_y = V_x * \tan(\beta)$ where $V_x$ is the longitudinal velocity and β is the sideslip angle. As shown in FIG. 4B, when a vehicle rolls over some portion of a vehicle's forward energy will be transferred to lateral energy. And, if a vehicle's lateral acceleration and lateral velocity exceeds the lateral energy threshold in FIG. 4A then a roll event may be occurring and will be detected by the various embodiments of the present invention. Some embodiments of the present invention may also utilize the initial roll angle and roll rate in such a lateral energy threshold to determine the rollover propensity for a vehicle that has an initial angle due to the characteristics of a driving surface.

Figure 5:
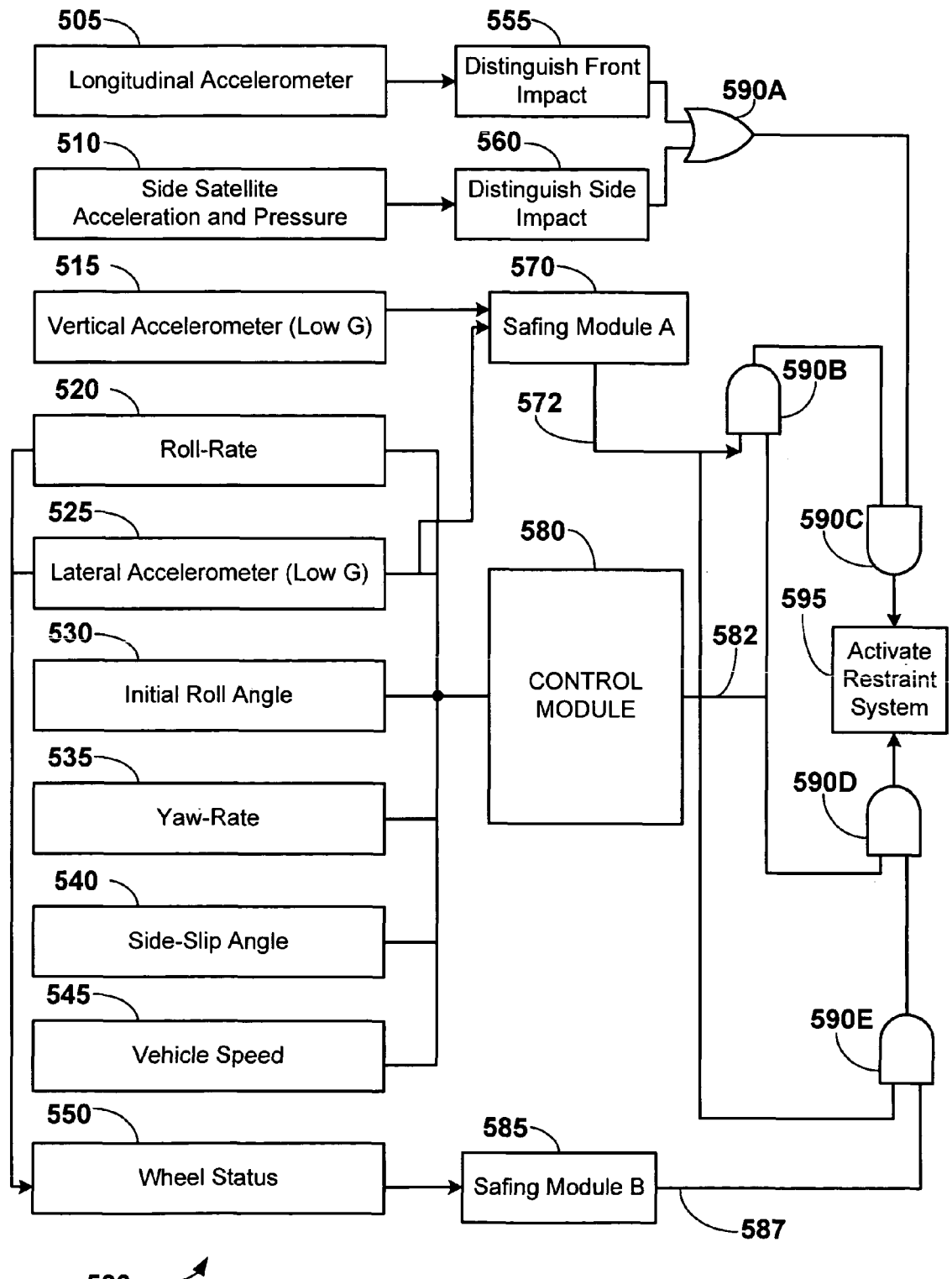
FIG. 5 is a block diagram of an embodiment of the present invention.

FIG. 5 is a block diagram of an embodiment of a rollover detection system 500. Generally, system 500 may generally comprise a plurality of data inputs 505-550, a control module 580, and an output 595. The plurality of data inputs may comprise a longitudinal accelerometer signal 505, a side acceleration accelerometer signal 510, a vertical acceleration signal 515, a roll-rate signal 520, a lateral accelerometer signal 525, an initial roll angle signal 530, a yaw-rate signal 535, a side-slip angle 540, a vehicle speed signal 545, and a wheel status signal 550. Some of the signals 505-550 may be measured by one or more sensors, or may be calculated with data from one or more sensors. For example, in some embodiments the vehicle speed signal 545 or the wheel status signal 550 may be calculated from data measured at one or more sensors sensing data near the wheels of an automobile. System 500 may also comprise various logic gates 590A-E capable of producing output 595 in response to the control module 580 output signal 582. Those of ordinary skill in the art will understand that any combination of logic gates may be used in addition to or in place of the AND and OR logic gates 590A-E.

Control module 580 may receive a plurality of signals 520-545 and may provide an output 582 in response to the plurality of signals 520-545. Control module 580 may also determine a first and second threshold in response to the plurality of signals 520-545, and may provide an output 582 in response to the first and second thresholds. For example in some embodiments, control module 580 may determine a kinetic energy based threshold in response to the roll rate signal 520, the lateral acceleration signal 525, and the initial roll angle signal 530. Control module 580 may additionally determine a lateral energy based threshold in response to the lateral acceleration signal 525, the yaw-rate signal 535, the side slip angle signal 540, and the vehicle speed signal 545. Additionally, control module 580 may be adapted or configured to dynamically update the kinetic energy based threshold or the lateral energy based threshold so that the thresholds may change as a function of signals 520-545. In some embodiments, a high G or a low G sensor may provide a high G and a low G signal to the control module 580. For example, a high G lateral acceleration signal may be provided to control module 580 for the kinetic energy based threshold, and a low G lateral acceleration signal may be provided to control module 580 for the lateral energy based threshold. This feature of some embodiments of the present invention may enable the control module 580 to receive both a high G and a low G signal, utilize both signals in determining at least one threshold, and providing a response to at least one threshold.

Some embodiments of system 500 may also comprise safing modules that may also receive a plurality of signals and provide a response to the received signals. For example, a safing module 570 may receive the vertical acceleration signal 515 and the lateral acceleration signal 525. In some embodiments, the vertical acceleration signal 515 and the lateral acceleration signal 525 may be high G or low G signals. Safing module 570 may also be adapted to provide a signal 572 in response to the vertical acceleration signal 515 and the lateral acceleration signal 525. Signal 572 may confirm that a rollover event has been detected. Safing module 570 may be further adapted to provide signal 572 when the lateral acceleration signal is higher than approximately 0.7 Gs and when the vertical acceleration signal is higher than approximately 0.5 Gs. In other embodiments, other lateral acceleration and vertical acceleration trigger points may be used to confirm detection of a rollover event. Signal 572 may also be provided as an input to the safing module 585.

Safing module 585 may also be utilized in some embodiments to confirm that a rollover event has been detected. Safing module 585 may receive signal 572 (the output of safing module 570), the roll-rate signal 520, the lateral acceleration signal 525, and the wheel status signal 550. Some of these signal may be high G or low G signals enabling safing module to receive signals with high or low resolution to confirm the occurrence of a rollover event. Safing module may be adapted to provide an output signal 587 that may confirm a rollover event. For example, in some embodiments, safing module 585 may confirm a roll event when the roll-rate signal 520, the lateral acceleration signal 525, and the wheel status signal 550 indicate a rollover event. Roll rate signal 520 may indicate a roll event when the roll rate exceeds approximately 30 degrees per second to approximately 40 degrees per second; the lateral acceleration signal 525 may indicate a rollover event when the lateral acceleration exceeds approximately 0.7 Gs; and the wheel status signal 550 may indicate a rollover event when a wheel load sensor indicates that a wheel is no longer in contact with a driving surface.

System 500 may also be adapted to confirm a rollover event by distinguishing between rollover and non-rollover events using the longitudinal acceleration signal 505. Generally, the longitudinal accelerations for front or front-offset crash zones and rollover events are one decimal difference. When rollover events occur, the longitudinal accelerations are approximately equal to or less than 1 G, and when front/front offset crashes occur, the longitudinal accelerations at crash zone are above 30 Gs and may sometimes equal approximately 100 Gs. Thus, some embodiments may be adapted to distinguish a rollover event from front or front-offset impact 555 and may generate a front-impact signal in response to the longitudinal acceleration signal 505. Some embodiments may use a 10 G to 15 G threshold for distinguishing between roll events and rollover events. Some embodiments may generate a logical high or low in response to the longitudinal acceleration signal 505 depending on the actual implementation of system 500.

System 500 may also be adapted to confirm a rollover event by distinguishing between rollover and non-rollover events using the side satellite acceleration signal 510. The lateral accelerations for rollover and side impact crashes are difficult to distinguish during these crash event types. Thus, two additional signals, side satellite acceleration/pressure and roll rate, are used to separate these two crash event types. In some embodiments a satellite accelerometer may be installed at a low B-pillar location and a satellite pressure sensor may be mounted within a door cavity. At least one of these sensors should be in the vehicle for side impact protection. If a vehicle trips, the vehicle may tend to roll over and a roll rate sensor may generate a large roll rate. If a vehicle experiences side impact, however, the satellite sensors may record a large magnitude of signals with lower roll rate values, and this difference may used to distinguish side impact events from rollover events. Thus, some embodiments may be adapted to distinguish a rollover event from side impact events 560 and may generate a front-impact signal in response to the satellite signals 510. Some embodiments may generate a logical high or low in response to the side satellite signals 510 depending on the actual implementation of system 500.

FIG. 6 depicts a logic flow diagram of a method 600 of an embodiment of the present invention. At 605, a rollover detection system may receive a plurality of signals representing automobile motion data. The plurality of data signals may comprise a vertical acceleration signal, a roll-rate signal, a lateral acceleration signal, an initial roll angle signal, a lateral acceleration signal, a yaw-rate signal, a side-slip angle signal, a vehicle speed signal, and a wheel status signal. Additionally, the rollover detection system may receive a longitudinal acceleration signal, a side satellite acceleration signal, and a side satellite pressure signal. The rollover detection system may receive these signals from various automobile sensors or these signals may be calculated from one or more data sets sensed by an automobile sensor. After receiving the plurality of data signals, a rollover detection system may determine a first and second rollover threshold at 610, 615. One threshold may be a kinetic energy based threshold and may be a function of roll rate and roll angle. Another threshold may be based on lateral energy, and may be function of lateral acceleration signal, the yaw-rate signal, the side-slip angle signal, and the vehicle speed signal. This threshold feature of some embodiments of the present invention may detect soft trip roll-over events, hard trip roll-over events, and slower rollover crashes earlier than the kinetic energy based threshold.

At 620 and 625, a rollover detection system may provide a response to the first or second threshold that may indicate that a rollover event is occurring or not occurring. At 630, a rollover detection system may be adapted to discriminate between a rollover event and a side impact or front impact events. This discrimination may be responsive to a longitudinal acceleration signal, or a side satellite acceleration signal and side satellite pressure signal. At 635, a rollover detection system according to some embodiments of the present invention may also be adapted to confirm a rollover event responsive to a vertical acceleration signal, a lateral acceleration signal, a roll-rate signal, and a wheel status signal. For example, some embodiments of a rollover detection system may confirm that a rollover event has occurred when a vertical acceleration signal and a lateral acceleration signal exceed a certain predetermined threshold. Additionally, some embodiments may confirm that a rollover event has occurred when a roll-rate signal, a lateral acceleration signal, and a wheel status signal reach a predetermined logical level or threshold indicating that a rollover event may be occurring.

And at 640, a rollover detection system may be further adapted to provide a control signal to activate an occupant restraint system. In some embodiments, the control signal may only activate an occupant restraint system if a rollover has been confirmed while in others such confirmation may not be necessary. The control signal may activate any combination of occupant restraint systems including front airbags, a side air bag, curtain airbags, seat belt retractors, and one or more pyro-buckle tensioners. Other occupant restraint systems may also be activated by the control signal, and in some embodiments, the control signal may activate one or more restraint systems in a certain predetermined order or at predetermined timing intervals. Those skilled in the art will understand that method 600 is only an embodiment of a method for detecting automobile rollover events and that other methods are possible according to the various embodiments of the present invention. Those skilled in the art will also understand that method 600 may be performed in alternative orders in detecting automobile rollover events.

The various embodiments of the present invention provide a rollover detection system capable of detecting rollover events that current detection systems can not effectively detect. For example some embodiments of the present invention may detect lower G, soil trip, S-turn, J-turn, and slow roll roll-over events while distinguishing embankment, drop down, and critical sliding velocity of roll versus non-roll events. Some embodiments may also utilize signals that may also be utilized by systems tasked with preventing roll-over events rather than responding to roll-over events. The various embodiments of the present invention while detecting difficult roll-events are also able to detect the less difficult roll-over events without sacrificing any performance characteristics in detecting the less-difficult rollover events.

The various embodiments of the present invention have been described with reference to the above discussed embodiments, but the present invention should not be construed to cover only these embodiments. Rather, these embodiments are only exemplary embodiments. Variations of the above exemplary embodiments may suggest themselves to those skilled in the art or others without departing from the spirit and scope of the present invention. The appended claims and their full range of equivalents should, therefore, only define the full scope of the present invention.

We claim:

1. A method of detecting a vehicle rollover in a control circuit of a vehicle, the method comprising:
   receiving a first set of signals from one or more first sensors, the signals representing a kinetic energy of the vehicle;
   receiving a second set of signals from one or more second sensors, the signals representing a lateral kinetic energy of the vehicle;
   outputting a first output signal based on a first threshold determined from the first set of signals and a second output signal based on a second threshold determined from the second set of signals; and
   outputting a control signal based on at least one of the first and second output signals.

2. The method of claim 1, further comprising deploying a vehicle occupant restraint system in response to the control signal.

3. The method of claim 1, further comprising outputting a front-impact signal in response to a longitudinal acceleration signal.

4. The method of claim 1, further comprising outputting a side-impact signal in response to a satellite acceleration signal and a satellite pressure signal.

5. The method of claim 1, further comprising outputting a confirmation signal in response to a vertical acceleration signal and a lateral acceleration signal.

6. The method of claim 1, further comprising outputting a confirmation signal in response to a roll rate signal, a lateral acceleration signal, and a wheel status signal.

7. The method of claim 1, wherein the first threshold is a function of a roll rate signal and a roll angle signal.

8. The method of claim 1, wherein the first set of signals comprises a vertical acceleration signal, a roll-rate signal, a lateral acceleration signal, and an initial roll angle signal.

9. The method of claim 1, wherein the second set of signals comprises a lateral acceleration signal, a yaw-rate signal, a side-slip angle signal, a vehicle speed signal, and a wheel status signal.

10. The method of claim 1, wherein the second threshold is a function of a lateral acceleration signal, a yaw-rate signal, a side-slip angle signal, and a vehicle speed signal.

* * * * *